R. SPENCER.

Furnace for Decomposing and Desulphurizing Ores.

No. 2,021. Reissued July 4, 1865.

Witnesses

R. J. Campbell
C. Schupfer

Inventor

Robert Spencer
by his Atty.
Mason Fenwick & Lawrence

N. PETERS, Photo-Lithographer, Washington, D. C.

UNITED STATES PATENT OFFICE.

ROBERT SPENCER, OF NEW YORK, N. Y.

IMPROVED FURNACE FOR DECOMPOSING AND DESULPHURIZING ORES.

Specification forming part of Letters Patent No. 44,986, dated November 8, 1864; Reissue No. 2,021, dated July 4, 1865.

DIVISION A.

*To all whom it may concern:*

Be it known that I, ROBERT SPENCER, of the city and county of New York, in the State of New York, have invented a new furnace for treating ores which are found embedded in quartz rock, and especially the ores of the precious metals, gold and silver; and I do hereby declare the following to be a full, clear, and exact description thereof, which will be the better understood by reference to the accompanying drawings, in which—

Figure 1:
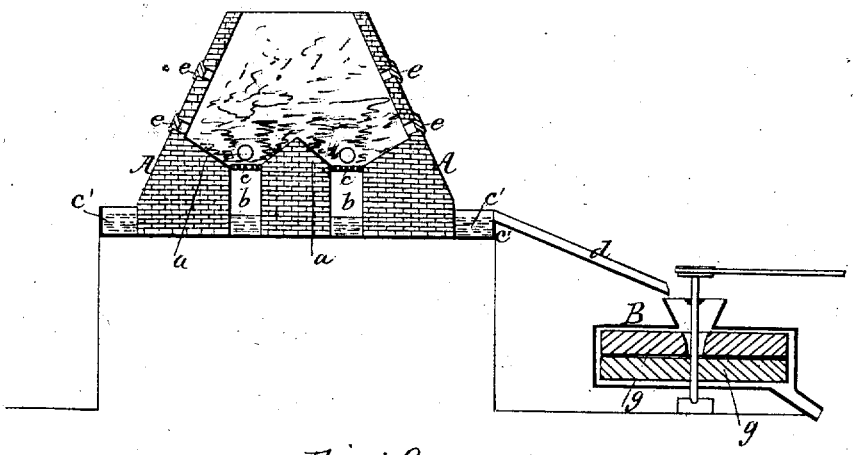
Figure 2:
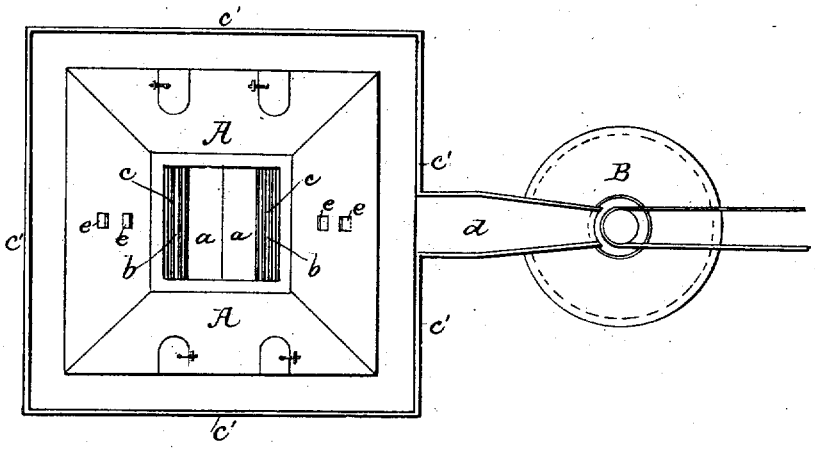

Figure 1 is a vertical section of the furnace; Fig. 2, a top view of the same.

The object of my invention is to provide a furnace in which the blocks of quartz containing the gold or silver ores can be taken direct from the quartz and heated to as high a degree and for as long a time as is necessary, and while at a glowing heat it may be suddenly dropped at once into a bath of water or other liquid by which the rock may become disintegrated and so softened and prepared that it may be readily ground and otherwise prepared for the process of amalgamation. For this purpose I construct a kiln of the form shown in the drawings. The walls may be made of rude stones—such as are usually found in the neighborhood of all quarries, in which case it should be lined with fire-brick, fire-clay, or other material that is fire-proof—or it may be made wholly of some fire-proof material.

The drawings represent a kiln in the form of the frustum of a pyramid, but any other shape may be adopted. In fact, I prefer making the side walls very nearly vertical from the outer extremities of the respective grates; but this is not essential.

Near the base of the kiln A is a ridged bottom, the inclined surfaces of which *a a* may be placed at any desired angle. The inclination should be sufficient to cause any substance placed upon their surfaces to glide down readily into the chambers *b b* when that descent is unobstructed. I prefer making this inclination somewhat greater than is shown in the drawings. The grates *c c* may be placed at the upper extremities of the chambers *b b*, as shown in the drawings, or they may be placed considerably lower down in those chambers, which is the position I generally prefer. These grates are so constructed that they may be made to suddenly slide or revolve in order that the contents of the furnace may be suddenly or gradually allowed to drop into the bath below at the pleasure of the operator. The bottom of this kiln A is surrounded by a wall, *c'*, of any desired height, which forms a basin or tank of convenient size. This basin is adapted to contain any liquid which it may be desired to employ for the purpose of suddenly quenching or chilling the ore when it is precipitated into it by withdrawing or revolving the grates *c c*. From the basin formed by this wall *c'* a trough, *d*, projects, in which the disintegrated ore may be conducted to the grinding apparatus, but this part of the arrangement is not essential to the successful operation of my invention. The rock may be conducted to the mill by any other ordinary means and be ground by any suitable machinery.

Having constructed the furnace where it is to be operated, we place a sufficient quantity of fuel upon the grates and then fill the furnace with rock containing the precious metals. This rock may be interspersed at suitable intervals with smaller layers of fuel, which I generally prefer to do.

The openings *e e* in the sides of the furnace are for the purpose of regulating the combustion of the fuel and consequently the degree of heat. When treating ores which contain any considerable quantity of sulphur, I propose to place a hood over the top of the kiln, bringing down the pipe connected therewith into a vessel arranged outside of the kiln. This hood may also be used when it is apprehended that any quantity of the precious metals is being driven off and lost by the heat of the furnace. The form of this hood may be of any of the shapes usual in furnaces intended for the manufacture of sulphuric acid or for collecting arsenic, and therefore need not be more particularly described.

It is intended by this invention to reduce large masses of ore to such a condition that it may be readily ground to powder without having gone through with the preliminary process of being broken into small nodules before it is submitted to the heat of the furnace.

In carrying out my invention it may sometimes be found desirable to use movable tanks or basins for chilling the ores as they fall into the water, so that when one tank is full another can be substituted in its place. It may also be desirable in working the furnace to so manipulate the grates as to let through only a portion of the heated rock at a time. In such cases the layers of fuel should all be made about equal to each other, and also the several layers of rock.

By a skillful use of the grates a single layer of the quartz may be allowed to pass the grate without carrying with it the succeeding layer of fuel, and by adding fuel and rock alternately at the top the fire may be kept up indefinitely.

Having thus described my invention, what I claim as new, and desire to secure by Letters Patent, is—

1. In a kiln or furnace for reducing quartz rock by heating and plunging the rock into a liquid bath, an arrangement by which the rock when highly heated may be precipitated at once from the furnace directly into the bath, substantially as described.

2. In a kiln or furnace for reducing the ores of the precious metal, the use of a hood and its usual appurtenances for the condensation and preservation of sulphur or of the fine particles of the precious metals, substantially as hereinbefore described.

ROBT. SPENCER.

Witnesses:
R. T. CAMPBELL,
E. SCHAFER.